United States Patent
Arias Bautista et al.

(10) Patent No.: US 7,459,492 B2
(45) Date of Patent: Dec. 2, 2008

(54) POLYPROPYLENE COMPOSITES WITH REINFORCEMENT BASED ON EGGSHELLS: PROCEDURE TO OBTAIN THE SAID COMPOSITE, REINFORCEMENT BASED ON EGGSHELLS, AND PROCEDURE FOR OBTAINING IT

(75) Inventors: José Luis Arias Bautista, Santiago (CL); Juan Raúl Quijada Abarca, Santiago (CL); Patricio Fernando Toro Estay, Santiago (CL); Pedram Mehrdad Yazdani, Santiago (CL)

(73) Assignee: Universidad de Chile, Santiago (CL)

( * ) Notice: Subject to any disclaimer, the term of this patent is extended or adjusted under 35 U.S.C. 154(b) by 60 days.

(21) Appl. No.: 11/239,539

(22) Filed: Sep. 28, 2005

(65) Prior Publication Data

US 2006/0068185 A1    Mar. 30, 2006

(30) Foreign Application Priority Data

Sep. 30, 2004    (CL)    .................................. 2542-2004

(51) Int. Cl.
*C08L 39/00*    (2006.01)
(52) U.S. Cl. ........................... 524/10; 524/17; 524/427; 524/451; 524/584
(58) Field of Classification Search ................ 524/584, 524/425, 451, 427, 449, 10, 17
See application file for complete search history.

(56) References Cited

U.S. PATENT DOCUMENTS

| | | | |
|---|---|---|---|
| 4,386,169 A | 5/1983 | Artur et al. | 523/200 |
| 4,837,259 A * | 6/1989 | Chucta | 524/258 |
| 5,064,893 A | 11/1991 | Hoenigmann | 524/427 |
| 6,403,692 B1 * | 6/2002 | Traugott et al. | 524/451 |

FOREIGN PATENT DOCUMENTS

| | | | |
|---|---|---|---|
| CN | 1583862 | | 2/2005 |
| GB | 1 562 952 | | 3/1980 |
| HU | 203 504 | A | 8/1991 |
| JP | 2-14280 | * | 5/1990 |
| JP | 2-142840 | | 5/1990 |
| JP | 5-132349 | | 5/1993 |
| JP | 9-59448 | * | 3/1997 |
| WO | WO 99/19396 A1 | * | 1/1999 |

OTHER PUBLICATIONS

JP 9-59448 (abstract in English).*
JP 2-142840 (translation in English).*

* cited by examiner

*Primary Examiner*—Bernard Lipman
(74) *Attorney, Agent, or Firm*—Merchant & Gould P.C.

(57) ABSTRACT

This invention reveals polypropylene composites to be used in the automotive, electronics, packaging and textile industries, which comprises a polypropylene homopolymer in a proportion ranging from 10 to 60% by weight, a natural reinforcement based on eggshells, and an antioxidant. This invention also reveals a natural reinforcement produced from eggshells obtained as an agroindustrial waste, the process to obtain said composite, and the process to obtain such reinforcement. By means of this invention, polypropylene composites using the natural reinforcement are obtained that have improved mechanical and thermal behavior when compared to polypropylene composites using traditional mineral reinforcements.

6 Claims, No Drawings

POLYPROPYLENE COMPOSITES WITH REINFORCEMENT BASED ON EGGSHELLS: PROCEDURE TO OBTAIN THE SAID COMPOSITE, REINFORCEMENT BASED ON EGGSHELLS, AND PROCEDURE FOR OBTAINING IT

The invention relates to the preparation of polypropylene composites using natural reinforcements from eggshells obtained as agroindustrial wastes, and it includes the process to obtain such composites, the natural eggshell reinforcement, and the process to obtain such reinforcement. This invention makes it possible to obtain polypropylene composites using natural reinforcements that have improved mechanical and thermal behavior when compared to the polypropylene composites using traditional mineral reinforcements. The composites of the invention can be used in all the technical fields that require such composites, such as the automotive, electronics, packaging and textile fields, among other fields in which they may be applicable according to the properties of the composite.

FIELD OF THE INVENTION

At present, the manufacture of composites made with thermoplastic and semicrystalline polymers such as polypropylene satisfies the demand for new materials and their incorporation into the requirements of new technologies.

Composites are polymer based materials that incorporate an additional component, a reinforcement in the polymer matrix, in such a way as to improve the properties of the composites. Most commonly, calcium carbonate or talc are used as reinforcements.

Polypropylene, the main raw material of the composites of this invention, has good resistance and ductility at a temperature of 20-25° C. and at moderate rates of deformation. However, it is brittle at temperatures below 0° C. and at high stress rates, thereby causing a rapid transition from ductile to fragile.

Due to this deficient behavior under extreme conditions, there is commercial and scientific interest in overcoming this disadvantage by modifying some properties, such as optimizing stiffness, impact resistance, homogeneous microstructure and degree of crystallinity by manufacturing new composites based on polypropylene at low production cost.

The applications of these composites are very extensive and are undergoing constant development. Depending on the degree of optimization of the composite properties it will be possible to include new fields of use and thus replace traditional materials. At present, polypropylene composites with reinforcements find use mainly in the automotive, electronic, packaging and textile industry, among others.

BACKGROUND OF THE INVENTION

The purpose of adding mineral reinforcements to polymers in order to obtain different composites has been mainly to fulfill a functional requirement such as increasing stiffness or reducing manufacturing costs.

The reinforcements used in polypropylene composites have usually been talc and calcium carbonate of mineral origin, and to a smaller extent mica and fibers. Usually, the addition of mineral reinforcements has an effect on the fragility of the polymer composite and decreases the impact energy. Therefore, the addition of rigid particles to polypropylene leads to a loss of flexibility in the polymer.

Alternatives for the development of polypropylene composites having better stiffness, impact resistance and crystallinity can be obtained by chemically modifying the polymer (which implies changing the molecular structure by the incorporation of functional groups or molecules in the polymerization process or by an insertion reaction additional to polymerization) as well as by the type of reinforcement used.

Polypropylene composites may be obtained by the use of resistant reinforcements such as fibers and/or by the incorporation of reinforcements of submicrometer particle size to reduce the plastic resistance of the composite.

In the manufacture process of a polypropylene composite, the molecular weight range or the melt flow index of polypropylene must be considered, as well as the homogeneous distribution of the reinforcement in the polymer matrix, in such a way that the maximum compatibility is achieved between the hydrophilic reinforcement and the hydrophobic matrix. Maximum interfacial adhesion must also be achieved between the reinforcement and the polymer matrix to optimize the mechanical and thermal properties of the composite. Usually this compatibility between the reinforcement and the polymer matrix can be improved by using polypropylenes that have different melt flow indices as well as by using reinforcements that have submicrometer particle size with a narrow particle size distribution.

The most commonly used reinforcements in polypropylene composites are calcium carbonate or talc, both having mineral origin, and it is possible to obtain polypropylene composites by mixing in an extrusion molding process. Polypropylene composites with these mineral reinforcements have better mechanical behavior than polypropylene alone. When a mineral material or chemical compound such as calcium carbonate or talc is incorporated, the cost decreases because of the lower use of polypropylene in the composite. With this invention, however, the production cost of polypropylene composites has been optimized, since a waste material, eggshells, is used as reinforcement.

Egg processing plants around the world use billions of eggs every year, depositing thousands of tons of eggshells in dump sites. In Chile 2,500 million eggs are produced per year, of which about 10% are meant for industrial use. This implies that annual industrial eggshell waste is in the order of 1,500 tons.

No information has been found in the state of the art on polypropylene composites with eggshell reinforcement, nor on the use of eggshells to obtain a natural reinforcement as shown in this invention.

The manufacture of polypropylene composites using eggshell reinforcement developed in this invention has the following advantages when compared to polypropylene composites using traditional and commercial natural reinforcements like calcium carbonate or talc:

- The composites of this invention combine the properties of the polymer matrix and the advantages of using an agroindustrial waste such as eggshells to obtain a natural type of reinforcement that has availability, recyclability, efficient use of energy, environmental benefits, and low cost.
- The composite of the invention has a higher Young's modulus, which means greater stiffness, than the polypropylene composite using a calcium carbonate reinforcement with the smallest commercially available average particle size ($d(50)=0.50$ μm).
- The composites of this invention have lower density, greater crystallinity and better mechanical behavior to traction and impact than polypropylene composites using calcium carbonate.

The natural reinforcement makes it possible to replace up to 75% by weight of total talc with the natural reinforcement in polypropylene composites, yet retaining the high stiffness of composites using submicrometer talc with an average particle size d(50)=0.50 μm. Thus, less talc is used as reinforcement in the polypropylene composite and the density of the composite decreases by up to 10% at the same time.

There is high compatibility and good adhesion between the natural reinforcement and polypropylene using polypropylenes that have different melt flow indices.

Lower rate of decrease of the energy absorbed on impact as the proportion of reinforcement in the polypropylene composite increases, compared with traditional reinforcements.

In addition, the natural reinforcement used to obtain polypropylene composites according to this invention has the following advantages with respect to traditional commercial mineral reinforcements such as calcium carbonate and talc:

A chemical composition whose main component, calcium carbonate, corresponds to one of the traditional mineral reinforcements most widely used in polypropylene composites.

A calcite crystallographic structure like that of mineral calcium carbonate.

Its average particle size is in the submicrometer range and it has a narrow particle size distribution, appropriate for use as reinforcement in a polypropylene matrix.

The morphology of its particles is laminar and therefore it allows better orientation in the polypropylene matrix.

Lower density than the traditional mineral reinforcements such as calcium carbonate and talc used as reinforcements in polypropylene.

Lower cost than the traditional mineral reinforcements used in polypropylene composites.

No technological use that may give it an added value: it is just an agroindustrial waste without further usefulness.

SUMMARY OF THE INVENTION

In this invention a procedure has been developed to obtain novel polypropylene composites with a reinforcement having natural origin like eggshells, thus obtaining composites that are competitive with respect to those composites using traditional mineral reinforcements.

These polypropylene composites with natural reinforcement have improved mechanical, thermal and structural behaviors when compared to those of polypropylene composites with traditionally used mineral reinforcements. This refers mainly to improved stiffness and impact resistance, as well as to the degree of crystallinity and the distribution and adhesion of the reinforcement particles in the polymer matrix, which are advantages with respect to polypropylene composites using mineral reinforcements such as calcium carbonate or talc. Moreover, the polypropylene composites with natural reinforcement developed in this invention give added value to a waste material of the poultry industry, namely eggshells, an abundant and recyclable biological waste.

Specifically, the invention relates to polypropylene composites with a natural reinforcement, the natural reinforcement obtained from eggshells, the procedure to (1) prepare the natural reinforcement from the agroindustrial waste in the form of eggshells, and (2) the procedure to prepare the semicrystalline polypropylene homopolymer composite with the natural reinforcement.

The natural reinforcement is produced from eggshells by crushing and grinding the eggshells together with the membrane that is attached to the calcareous wall. The grinding of the eggshells produces a material smaller than ASTM 400 mesh. This ground material is used as reinforcement to obtain polypropylene composites having different melt flow indices.

The process of manufacturing the composite using the natural reinforcement includes dosing and mixing the composite components—polypropylene, an antioxidant and the dry natural reinforcement—in a stream of an inert gas like nitrogen, argon or helium, among others; pressing the material obtained from the mixing step; and finally granulating the pressed material.

DETAILED DESCRIPTION OF THE INVENTION

The procedure to obtain polypropylene composites using natural reinforcements according to the invention comprises the following steps:

a) Sequential dosing of a polypropylene homopolymer, an antioxidant and the dry natural reinforcement in a discontinuous mixer.

b) Mixing at 70-75 rpm the mixture obtained in step (a) at 190-195° C. during 10-15 minutes in a stream of an inert gas such as gaseous nitrogen.

c) Pressing the mass obtained from the mixing step at 40-50 bar and 30-40° C.

d) Triturating the pressed material.

Step (a), dosing the composite components, includes adding between 10% and 60% by weight of natural reinforcement to the polypropylene homopolymers, and involves adding an antioxidant such as, for example, Irganox 1010® and Irgafos 168® supplied by Petroquim S.A., in a 2:1 ratio, corresponding to 0.2-0.3% by weight of the total mass of composite. This antioxidant prevents the degradation of polypropylene during the mixing process.

Step (b) is carried out in a discontinuous mixer. Mixing the composite components, polypropylene, antioxidant and natural reinforcement, has the purpose of distributing homogeneously the natural reinforcement in the half-molten polypropylene matrix. Once all the composite components have been added, mixing is continued during 10-15 minutes in a stream of inert gas like nitrogen, for example, whose function is to displace the oxidizing air environment in the chamber and prevent the degradation of polypropylene.

The mass obtained in step (b) is pressed at 40-60 bar and 30-40° C. to obtain pressed plates 1-2 mm thick that finally go to step (d), which involves granulation of the resulting plates.

Step (d), granulation of the plates, is carried out by manual or mechanical cutting into rectangular pieces approximately 1-3 mm long and wide.

The granular material corresponds to the composite of the invention, having a composition according to the selected dosing of the natural reinforcement obtained from eggshells, which may be in the range of 10-60% by weight.

From this granulated composite test specimens sized according to ASTM standards were obtained in order to determine their mechanical tensile properties (ASTM standard D 638), Izod impact testing (ASTM standard D 256) and density (ASTM standard 792), as well as to perform the corresponding thermal tests for these composites.

The procedure described in this invention to obtain polypropylene composites using natural reinforcement from eggshells involves having this natural reinforcement available under conditions suitable for dosing and mixing it with polypropylene. In order to achieve this objective, this invention also comprises the procedure to manufacture the natural reinforcement using the eggshells obtained from agroindustrial wastes.

Procedure to Obtain the Natural Reinforcement from Eggshells

The procedure to obtain the natural reinforcement from eggshells comprises the following steps:
a) crushing and sifting the agroindustrial material below ASTM 100 mesh;
b) drying at 100-110° C. during 8-9 hours; and
c) mechanical grinding and sifting the product obtained in step (b) to get particles below ASTM 400 mesh.

The crushing step (a) of the eggshells consists in obtaining the material having a homogeneous particle size by means of a manual or mechanical procedure to obtain particles below ASTM 100 mesh.

The manual crushing procedure may be carried out, for example, using a porcelain mortar to break up the material down to the required size below ASTM 100 mesh.

The mechanical crushing procedure may be carried out using any appropriate equipment for that function, for example, a mechanical device with flat metallic blades or cutters, and one skilled in the art may be able to use any equipment that will allow getting the material below ASTM 100 mesh in a shorter time and processing a larger amount of material as may be required.

The eggshells crushed to a particle size below ASTM 100 mesh is dried in an oven that allows the temperature to be kept between 100 and 110° C. during 8 to 9 hours (step b). This procedure to optimize the grinding process is a necessary requirement to optimize the grinding process in the following step in order to obtain the natural reinforcement.

The grinding of the dry natural reinforcement (step c) below ASTM 100 mesh is carried out by means of any appropriate device, such as a concentric metal ring mill or a metal ball mill. The time required for grinding depends on the capacity of the device used for grinding. For example, in a metal ring mill with a maximum volume capacity of 0.5 liters, 150-190 grams of dry natural reinforcement below ASTM 100 mesh can be ground in about 10-12 minutes.

The material resulting from this grinding operation is sifted through an ASTM 400 mesh sieve, and the submicrometer natural reinforcement below ASTM 400 mesh is obtained with a yield between 90 and 95% by weight of the processed agroindustrial material.

EXAMPLES

The examples include the manufacturing process of polypropylene homopolymer composites using the natural reinforcement developed in this invention, according to the procedure proposed and developed herein.

Example 1

Preparation of the Submicrometer Natural Reinforcement

The process to obtain the submicrometer natural reinforcement from eggshells comprises the following steps:
a) Crushing in a mechanical device with flat metal blades.
b) Sifting the crushed eggshells through ASTM 100 mesh.
c) Drying the eggshells sifted below ASTM 100 mesh at 100° C. during 8 hours.
d) Grinding the dry eggshells obtained in step (c) in a concentric metal ring mill during 10 minutes to obtain a mass equal to 200 grams of material.
e) Sifting the ground eggshells through ASTM 400 mesh.

As a final product of the process described above, the natural eggshell reinforcement below ASTM 400 mesh is obtained. For 200 grams of ground mass, 90% passed through ASTM 400 mesh.

Table 1 shows the composition of the natural reinforcement and its crystallographic analysis by x-ray diffraction.

TABLE 1

Chemical and crystallographic analysis of the natural reinforcement

| Composition | Content |
|---|---|
| Calcium carbonate | 95% by weight |
| Organic matter, sulfated polysaccharides, collagen and other proteins | 5% of dry weight |
| Moisture | 1-2% |
| X-ray diffraction crystallographic analysis: | 99% calcite |

The granulometric analysis of the natural submicrometer reinforcement or natural reinforcement is summarized in Table 2.

Table 2 shows the average particle size, or d(50), the particle size in a 10% proportion, or d(10), and the particle size in a 90% proportion, or d(90), together with the value of the surface area determined according to a BET nitrogen adsorption analysis.

TABLE 2

Characteristics of the natural reinforcement

| Natural reinforcement | Particle size (μm) | | | Surface area |
|---|---|---|---|---|
| | d(10) | d(50) | D(90) | BET ($m^2$/g) |
| | 1.7 | 8.4 | 27.5 | 18 |

Example 2

Procedure to Obtain Polypropylene Composites with Natural Reinforcement

The polypropylene composite with natural reinforcement from eggshells consists of the following raw materials:
1. Polypropylene.
2. Natural reinforcement from submicrometer eggshells.
3. Antioxidant.

The used commercial polypropylene homopolymers (PH) were supplied by Petroquim S.A. and correspond to three different melt flow indices: 4 (PH 013), 13 (PH 1310) and 26 (PH 2610), having the properties shown in Table 3.

TABLE 3

Characteristics of polypropylenes used in this invention.

| Type | Crystallization temperature $T_c$ (° C.) | Melting temperature $(T_f)$ (° C.) | Crystallinity (%) | MFI* (g/10 min) | Molecular weight $\times 10^3$ (g/mol) |
|---|---|---|---|---|---|
| PH 013 | 108.6 | 166.8 | 31.0 | 4 | 340 |
| PH 1310 | 113.4 | 164.7 | 42.9 | 13 | 250 |
| PH 2610 | 118.3 | 166.9 | 45.1 | 26 | 170 |

*MFIF = Melt flow index

Antioxidant:

The antioxidants Irganox 1010 and Irgafos 168, supplied by Petroquim S.A., were used in a 2:1 ratio, respectively.

This example describes the steps to obtain a polypropylene composite with 40% by weight of natural reinforcement and for a total mass of 40 grams, equivalent to the capacity of the used discontinuous mixer, comprising:
a) dosing and mixing the composite components—polypropylene PH 1310 (24 grams), antioxidant (0.048 grams) and dry natural reinforcement (16 grams)—in a discontinuous mixer at 190° C. and 75 rpm during 10 minutes under a stream of an inert gas like nitrogen;
b) pressing at 40 bar and 30° C. the mass obtained from the mixing step in the discontinuous mixer to obtain 1-2 mm thick pressed sheets; and
c) triturating the pressed material or polypropylene composite with 40% by weight of natural reinforcement, to obtain rectangular pieces approximately 1-3 mm long and wide. The results are summarized in Table 5.

The procedure described was used for the preparation of composites made of polypropylene PH 013 and/or PH 2610 with 20 and 40% by weight of natural reinforcement as summarized in Table 5.

Example 3

At the same time, polypropylene composites with traditional mineral reinforcements (calcium carbonate or talc) were prepared according to the procedure described for the polypropylene composite with natural eggshell reinforcement. Commercial calcium carbonate and talc with three different average particle sizes and BET surface areas as summarized in Table 4 were used as traditional reinforcements.

Commercial Calcium Carbonates:
CC1 industrial (Truco)
CC2 Calfort 3 and
CC3 Microcarb 95T, both supplied by Reverté.

Commercial Talc:
TA1 industrial (Rocco)
TA2 HiTalc HTP2 and
TA3 HiTalc ultra5c, both supplied by Imifabi S.P.A.

TABLE 4

Characteristics of the traditional mineral reinforcements

| Characteristics of the traditional mineral reinforcements | | | | | BET Surface |
|---|---|---|---|---|---|
| | | Particle size (μm) | | | area |
| Reinforcement | Nomenclature | d(10) | d(50) | d(90) | (m²/g) |
| Calcium | CC 1 | 2.7 | 17.1 | 42.6 | 2.2 |
| carbonate | CC 2 | 0.4 | 2.0 | 10.2 | 3.2 |
| | CC 3 | 0.3 | 0.7 | 1.7 | 9.1 |
| Talc | TA 1 | 3.0 | 10.7 | 29.5 | 4.6 |
| | TA 2 | 0.7 | 2.4 | 6.5 | 6.3 |
| | TA 3 | 0.4 | 0.5 | 2.8 | 11.9 |

This example describes the steps to obtain a polypropylene composite with 40% by weight of calcium carbonate CC1 mineral reinforcement and for a total mass of 40 grams, equivalent to the capacity of the used discontinuous mixer, comprising:
a) dosing and mixing the composite components—polypropylene PH 1310 (24 grams), antioxidant (0.048 grams) and dry CC1 reinforcement (16 grams)—in a discontinuous mixer at 190° C. and 75 rpm during 10 minutes under a stream of an inert gas like nitrogen,
b) pressing at 40 bar and 30° C. the mass obtained from the mixing step in the discontinuous mixer to obtain 1-2 mm thick pressed sheets, and
c) triturating the pressed material or polypropylene composite with 40% by weight of CC1 reinforcement, to obtain rectangular pieces approximately 1-3 mm long and wide.

The same procedure was used for the preparation of polypropylene composites PH 013 and PH 2610 with traditional mineral reinforcements CC2, CC3, TA1, TA2 and TA3 with 20%, 40% and 60% by weight of reinforcement as summarized in Table 5. The composites shown in Tables 5 and 6 are composed of polypropylene, antioxidant and reinforcement, wherein the percentage of polypropylene includes the antioxidant.

Example 4

Additionally, polypropylene composites with a mixture of reinforcements, i.e. mineral reinforcements such as talc and the natural reinforcement according to the procedure described for the polypropylene composite with natural eggshell reinforcement, were prepared. The traditional used reinforcement was commercial talc with three different average particle sizes and BET surface areas, as summarized in Table 4.

This example describes the steps to obtain a polypropylene composite with 40% by weight of total reinforcement, of which 10% by weight corresponds to the mineral reinforcement talc and 30% by weight to the natural reinforcement for a total mass of 40 grams, equivalent to the capacity of the used discontinuous mixer, comprising:
a) dosing and mixing the composite components—polypropylene PH 1310 (24 grams), antioxidant (0.048 grams), dry TA3 reinforcement (4 grams), and dry natural reinforcement (12 grams)—in the discontinuous mixer at 190° C. and 75 rpm during 10 minutes under a stream of an inert gas like nitrogen,
b) pressing at 40 bar and 30° C. the mass obtained from the mixing step in the discontinuous mixer to obtain 1-2 mm thick pressed sheets, and
c) granulating the pressed material or polypropylene composite with 40% by weight of total reinforcement (a mixture of 10% talc TA3 and 30% natural reinforcement), to obtain rectangular pieces approximately 1-3 mm long and wide.

The same procedure was used for the preparation of polypropylene composites PH 013 and PH 2610 with a mixture of mineral reinforcements TA1 or TA2 or TA3 and natural reinforcement in a proportion of 40% by weight of total reinforcement as summarized in Table 6. The composites shown in Table 6 comprise polypropylene, antioxidant and reinforcements, wherein the percentage of polypropylene includes the antioxidant.

The tests carried out to verify the mechanical and thermal properties of the polypropylene composites with natural reinforcement, as well as of the polypropylene composites with traditional mineral reinforcements and the polypropylene composites with mixtures of mineral reinforcement and natural reinforcement, were the following:

Tensile tests according to ASTM standard D 638, to determine Young's modulus in megapascals (MPa).

Izod impact tests at −20° C. according to ASTM standard D 256, to determine the energy absorbed on impact in (J/m).

Density tests according to ASTM standard 679 in g/cm³.

Thermal tests by differential scanning calorimetry that allows the degree of crystallinity to be obtained as a percentage (%).

The results obtained from the above mentioned tests with the polypropylene composites with natural eggshell reinforcements, traditional mineral reinforcements and mixtures of mineral reinforcement and natural reinforcement, corresponding to 31 samples, are summarized in Table 5.

TABLE 5

Results of mechanical, thermal and density tests for polypropylene composites with reinforcements.

| Sample | Polymer Type | Polymer MFI (g/10 min) | Reinforcement Type | Polymer % peso | Reinforcement % weight | Young's modulus (MPa) | Density (g/cm3) | Impact (J/m) | Crystallinity (%) |
|---|---|---|---|---|---|---|---|---|---|
| 1 | PH1310 | 13 |  | 100 |  | 1183 | 0.9120 | 38.3 | 43 |
| 2a | PH1310 | 13 | CC1 | 80 | 20 | 1431 |  | 35.2 |  |
| 3a | PH1310 | 13 | CC2 | 80 | 20 | 1405 |  |  |  |
| 4a | PH1310 | 13 | CC3 | 80 | 20 | 1607 |  |  |  |
| 5a | PH1310 | 13 | NR | 80 | 20 | 1650 |  | 29.3 |  |
| 6a | PH1310 | 13 | TA1 | 80 | 20 | 1674 |  | 25.6 |  |
| 7a | PH1310 | 13 | TA2 | 80 | 20 | 1760 |  |  |  |
| 8a | PH1310 | 13 | TA3 | 80 | 20 | 2304 |  |  |  |
| 2b | PH1310 | 13 | CC1 | 60 | 40 | 1591 | 1.2435 | 19.6 | 51 |
| 3b | PH1310 | 13 | CC2 | 60 | 40 | 1801 |  |  | 52 |
| 4b | PH1310 | 13 | CC3 | 60 | 40 | 1866 |  |  | 46 |
| 5b | PH1310 | 13 | NR | 60 | 40 | 2017 | 1.2202 | 20.3 | 48 |
| 6b | PH1310 | 13 | TA1 | 60 | 40 | 2135 |  | 10.3 | 46 |
| 7b | PH1310 | 13 | TA2 | 60 | 40 | 2270 | 1.2213 | 14.2 | 52 |
| 8b | PH1310 | 13 | TA3 | 60 | 40 | 2909 |  | 18.3 | 59 |
| 9 | PH2610 | 26 |  | 100 |  | 1250 | 0.9116 | 37.2 |  |
| 10a | PH2610 | 26 | CC1 | 80 | 20 | 1494 |  | 34.2 |  |
| 11a | PH2610 | 26 | CC2 | 80 | 20 | 1497 |  |  |  |
| 12a | PH2610 | 26 | CC3 | 80 | 20 | 1555 |  |  |  |
| 13a | PH2610 | 26 | NR | 80 | 20 | 1572 |  | 24.7 |  |
| 14a | PH2610 | 26 | TA1 | 80 | 20 | 1825 |  | 30.9 |  |
| 15a | PH2610 | 26 | TA2 | 80 | 20 | 1879 |  |  |  |
| 16a | PH2610 | 26 | TA3 | 80 | 20 | 2288 |  |  |  |
| 10b | PH2610 | 26 | CC1 | 60 | 40 | 1598 | 1.2399 | 20.5 |  |
| 11b | PH2610 | 26 | CC2 | 60 | 40 | 1835 |  |  |  |
| 12b | PH2610 | 26 | CC3 | 60 | 40 | 1918 |  |  |  |
| 13b | PH2610 | 26 | NR | 60 | 40 | 2323 | 1.2167 | 22.3 |  |
| 14b | PH2610 | 26 | TA1 | 60 | 40 | 2323 |  | 18.3 |  |
| 15b | PH2610 | 26 | TA2 | 60 | 40 | 2652 | 1.2387 |  |  |
| 16b | PH2610 | 26 | TA3 | 60 | 40 | 2782 |  |  |  |
| 17 | PH0610 | 4 |  | 100 |  | 1060 | 0.9322 | 38.0 | 39 |
| 18 | PH0610 | 4 | CC1 | 60 | 40 | 1602 |  | 36.3 | 45 |
| 19 | PH0610 | 4 | CC2 | 60 | 40 | 1734 |  |  |  |
| 20 | PH0610 | 4 | NR | 60 | 40 | 1755 |  | 25.4 | 44 |
| 21 | PH0610 | 4 | TA1 | 60 | 40 | 2000 |  | 30.9 | 48 |
| 22 | PH0610 | 4 | TA2 | 60 | 40 | 2124 |  |  |  |
| 23 | PH0610 | 4 | CC1 | 40 | 60 | 1467 | 1.5354 | 16.5 | 43 |
| 24 | PH0610 | 4 | NR | 40 | 60 | 2035 | 1.4869 | 12.5 | 42 |
| 25 | PH0610 | 4 | TA1 | 40 | 60 | 2239 | 1.5307 | 4.2 |  |

MFI = Melt flow index
NR = Natural reinforcement

TABLE 6

Results of mechanical tests for polypropylene composites with reinforcements.

| Sample | Polymer Type | Polymer MFI (g/10 min) | Reinforcement Type | Polymer % weight | Reinforcement % weight | Young's modulus MPa |
|---|---|---|---|---|---|---|
| 8b | PH1310 | 13 | TA3 | 60 | 40 | 2909 |
| 26 | PH1310 | 13 | TA3 | 60 | 20 |  |
|  |  |  | NR |  | 20 | 2660 |
| 27 | PH1310 | 13 | TA3 | 60 | 10 |  |
|  |  |  | NR |  | 30 | 2470 |
| 16b | PH2610 | 26 | TA3 | 60 | 40 | 2782 |
| 28 | PH2610 | 26 | TA3 | 60 | 20 |  |
|  |  |  | NR |  | 20 | 2633 |
| 29 | PH2610 | 26 | TA3 | 60 | 10 |  |
|  |  |  | RN |  | 30 | 2531 |
| 30 | PH0610 | 4 | TA2 | 60 | 40 | 2124 |

TABLE 6-continued

Results of mechanical tests for polypropylene composites with reinforcements.

| Sample | Polymer Type | Polymer MFI (g/10 min) | Reinforcement Type | Polymer % weight | Reinforcement % weight | Young's modulus MPa |
|---|---|---|---|---|---|---|
| 31 | PH0610 | 4 | TA2<br>NR | 60 | 20<br>20 | 2123 |

MFI = Melt flow index
RN = Natural reinforcement

According to the results shown in Tables 5 and 6, the tests carried out with the polypropylene composites with natural reinforcement, traditional mineral reinforcements and/or mixtures of mineral reinforcement and natural reinforcement have proved the competitiveness of the composite using the natural reinforcement developed in this invention with respect to the polypropylene composites using traditional mineral reinforcements such as calcium carbonate or talc.

The characteristics deduced from the results in Tables 5 and 6 for the polypropylene composites with natural reinforcement show that:

The polypropylene composites using natural reinforcement and/or using traditional mineral reinforcements have an increased Young's modulus, i.e. stiffness, with respect to polypropylene, according to the tensile tests carried out with the composites having the formulations indicated in Table 5.

In this respect it has been established that:

The polypropylene composites using natural reinforcement of average particle size d(50)=8.4 μm showed greater stiffness than all the polypropylene composites using calcium carbonate as reinforcement, including the calcium carbonate with the smallest particle size, i.e. d(50)=0.5 μm. This was valid for composites with 20% and 40% by weight of reinforcement and also for all the used polypropylenes having different melt flow indices.

The stiffness of the polypropylene composites with natural reinforcement of particle size d(50)=8.4 μm is lower than that of all the polypropylene composites with talc of average particle size d(50)=11.0, 2.4 and 0.5 μm for composites having 20% and 40% by weight of reinforcement and for all the used polypropylenes having different melt flow indices used.

The greater stiffness of the polypropylene composites using talc, and in particular the polypropylene composite using talc TA3 with the smallest average particle size available commercially, d(50)=0.5 μm, is maintained when 50% to 75% of the talc is replaced by the natural reinforcement. That is, the hybrid composite of polypropylene formed using the reinforcement mixture of talc TA3 and natural reinforcement retains the stiffness of the polypropylene composite using only talc. This is observable for the compositions having 20% and 40% by weight of total reinforcement and for all the used polypropylenes having different melt flow index.

From the impact tests it was found that the impact energy absorbed by the polypropylene composites using reinforcement is lower than that of polypropylene, and it decreases as the proportion of reinforcement in the composite increases. In the case of composites using natural reinforcement, the rate of decrease of the absorbed energy is smaller as the weight proportion of the natural reinforcement increases when compared to the increases in the same weight proportion of the calcium carbonate and/or talc mineral reinforcements. This was valid for all the used polypropylenes having different melt flow indices.

The density of the polypropylene composites using natural reinforcement is lower than the density of the polypropylene composites using calcium carbonate and/or talc mineral reinforcement. This lower density of the polypropylene composite using natural reinforcement is observable to a larger extent when the proportion by weight of natural reinforcement in the polypropylene composite increases from 40% to 60% by weight.

From the thermal analysis it was found that the polypropylene composites with natural reinforcement have higher crystallinity than polypropylene. This is reflected in the thermal behavior of the composites, which means that changes in the degree of crystallinity are greater in the polypropylene composite using natural reinforcement than in the polypropylene composites using traditional calcium carbonate and/or talc reinforcements. This was used for the preparation of composites of polypropylene PH1310 and PH0610 having 40 and 60% by weight of reinforcement.

What is claimed is:

1. A polypropylene composite comprising:
   a) a polypropylene homopolymer in a proportion between 59.8 and 79.8 weight %;
   b) a natural reinforcement from whole eggshells comprising its organic membrane in a proportion between 10 to 20 weight %;
   c) a mineral reinforcement comprising talc or calcium carbonate of mineral origin in a proportion between 10 to 20 weight %; and
   d) an antioxidant in a range from 0.2-0.3 weight %.

2. A polypropylene composite according to claim 1, comprising 10% of mineral reinforcement and 30% of natural reinforcement.

3. The polypropylene composite of claim 1, wherein the total amount of natural reinforcement and mineral reinforcement is about 40 weight % of the composite.

4. The polypropylene composite of claim 1, wherein the natural reinforcement comprises a particle size range wherein d(10) is 1.7 μm, d(50) is 8.4 μm, and d(90) is 27.5 μm and a BET surface area of 18 m$^2$/g.

5. The polypropylene composite of claim 1, wherein the mineral reinforcement comprises a particle size range wherein d(10) is 0.4 μm to 3 μm, d(50) is 0.5 μm to 10.7 μm, and d(90) is 2.8 μm to 29.5 μm and a BET surface area of 4.6 m$^2$/g to 11.9 m$^2$/g.

6. The polypropylene composite of claim 1, wherein the natural reinforcement from whole eggshell comprise 95 weight % of calcium carbonate and 5 weight % of organic matter, sulfated polysaccharides, collagen, and other proteins.

* * * * *